No. 880,074. PATENTED FEB. 25, 1908.
E. HAAGN.
ELECTRICAL SYSTEM OF MEASURING TEMPERATURES.
APPLICATION FILED MAY 27, 1907.

3 SHEETS—SHEET 1.

Witnesses:
C. H. Taylor
J. J. McCarthy

Inventor:
Ernst Haagn
by Foster Freeman Watson & Coit
attys

No. 880,074. PATENTED FEB. 25, 1908.
E. HAAGN.
ELECTRICAL SYSTEM OF MEASURING TEMPERATURES.
APPLICATION FILED MAY 27, 1907.

3 SHEETS—SHEET 2.

No. 880,074. PATENTED FEB. 25, 1908.
E. HAAGN.
ELECTRICAL SYSTEM OF MEASURING TEMPERATURES.
APPLICATION FILED MAY 27, 1907.

3 SHEETS—SHEET 3.

Witnesses

Inventor
Ernst Haagn,

UNITED STATES PATENT OFFICE.

ERNST HAAGN, OF HANAU, GERMANY, ASSIGNOR TO FIRM OF W. C. HERAEUS, OF HANAU, GERMANY.

ELECTRICAL SYSTEM OF MEASURING TEMPERATURES.

No. 880,074.  Specification of Letters Patent.  Patented Feb. 25, 1908.

Application filed May 27, 1907. Serial No. 375,989.

*To all whom it may concern:*

Be it known that I, ERNST HAAGN, a subject of the German Emperor, and a resident of Hanau, Germany, doctor of philosophy, have invented certain new and useful Improvements in an Electric System of Measuring Temperatures, of which the following is a specification.

My invention relates to improvements in an electric system of measuring temperatures, and more particularly to that class in which the resistance and thereby also the temperature indicated by a resistance thermometer is measured by means of Wheatstone's bridge. The systems of this class heretofore in use require an adjustment of the resistances of the bridge for each temperature to be measured which method causes a considerable loss of time and furthermore cannot be executed by an unlearned laborer. Now, the object of my invention is to provide a system of this class by means of which temperatures of any intervals can be measured and directly read from the instrument and with any desired rate of accuracy and by means of the same galvanometer and other parts. My invention also relates to providing means, whereby differences of the voltage of the source of electricity supplying current to the system are balanced.

An important feature of my invention consists in improved means, whereby the resistance of the conductor including the resistance thermometer is balanced.

For the purpose of illustrating my invention, I have shown an example thereof in the accompanying drawings, in which—

Figure 1:
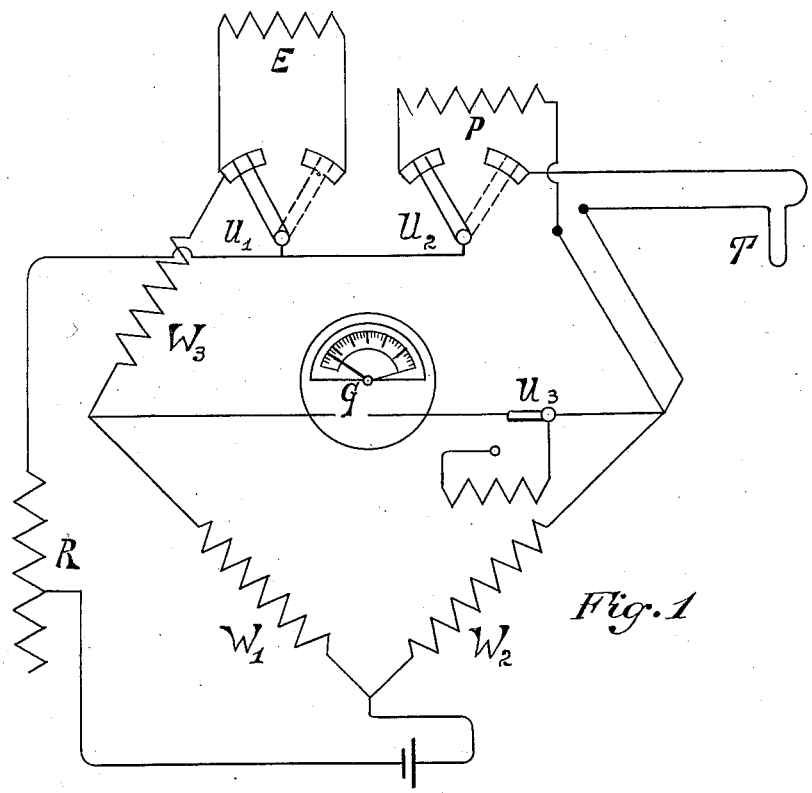
Figure 2:
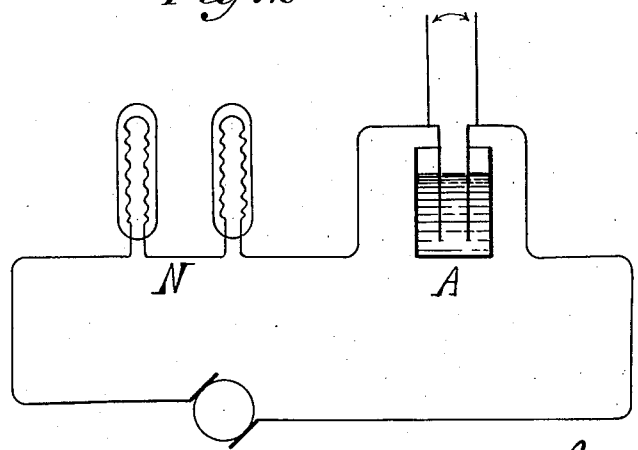
Figure 3:
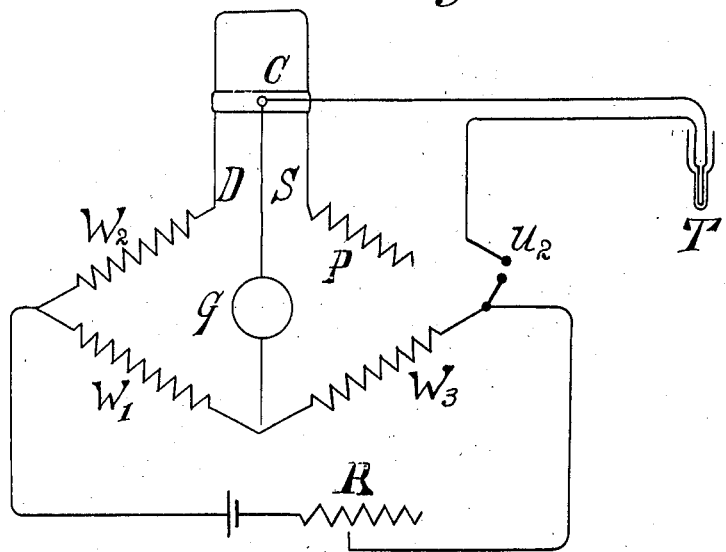
Figure 4:
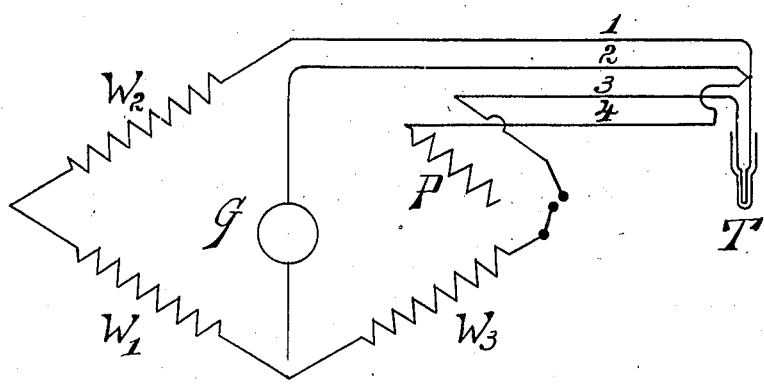
Figure 5:
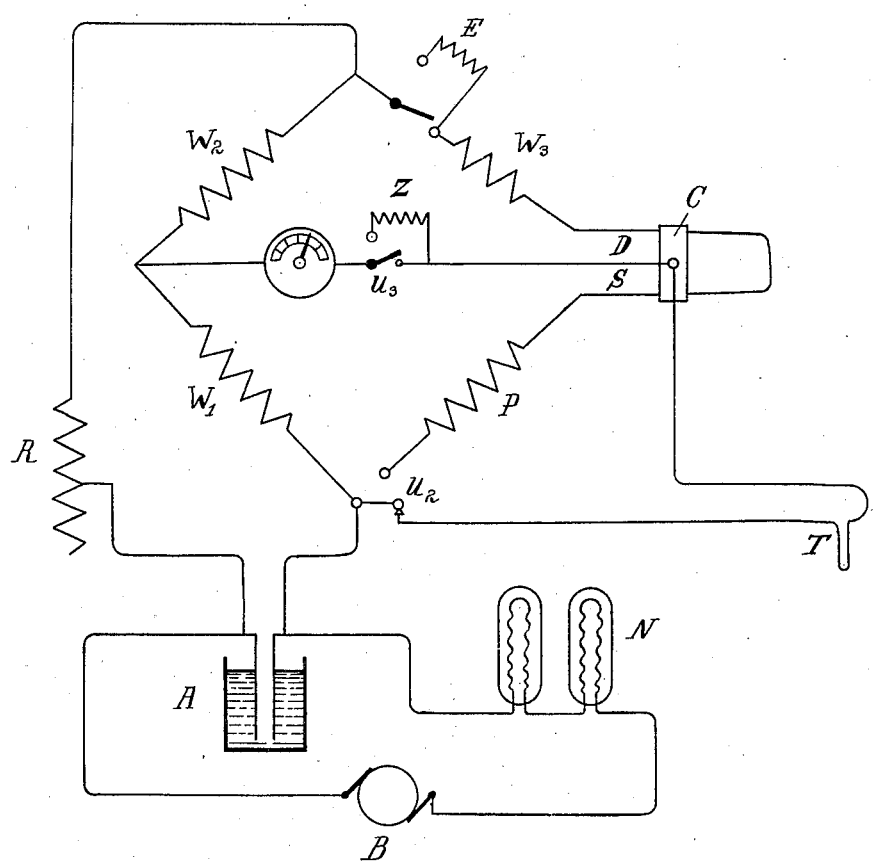

Figure 1 is a diagrammatical representation of the system, showing, as an example, means to obtain direct measurements of any desired accuracy, Fig. 2 is a diagrammatical view of a part of the system, showing means to balance variations of the voltage of the source of electricity, Fig. 3 is a diagrammatical representation of means to balance the resistance of the conductor including the thermometer, Fig. 4 is a diagrammatical view of a modification of the means shown in Fig. 3 and Fig. 5, a diagrammatical view of a system embodying the parts shown in Figs. 1 and 3.

Similar letters of reference refer to similar parts in the different views.

For the purpose of clearness I have shown the different parts of the system in different views, though it is evident, that they may be combined in a single system as shown in Fig. 5.

Referring now particularly to the part of the system an example of which is illustrated in Fig. 1, a resistance thermometer T is included in a branch of a bridge to which current is supplied from a storage battery B. In the other branches of the bridge resistances $W_1$ and $W_2$, and $W_3$ are included, the resistances $W_1$ and $W_2$ being equal to that of the thermometer. An additional resistance E may be connected in series with $W_3$ by means of a switch $U_1$. By means of a further switch $U_2$, the thermometer may be cut out of its branch, and a testing resistance P may be switched in. The latter is equal to the resistance of the thermometer at any suitable known temperature. By means of a switch $U_3$, an additional resistance Z may be switched in the branch of the galvanometer, whereby the sensitiveness of the galvanometer G can be varied at will.

The current passing through the galvanometer is, other conditions not being altered, a function of the resistance of the thermometer. When using a constant voltage, the galvanometer can therefore be used to directly indicate the variations of the resistance of the thermometer, whereby also the temperature of the latter will be indicated. Now, this method of directly reading the temperatures is sufficiently exact with temperatures of the thermometer varying within small limits and causing a weak current to pass through the galvanometer, while, when the variations of the temperature are large and the current is strong, and therefore the displacement of the pointer of the galvanometer is large, the measurements will not be very accurate. If, for example, the resistances of $W_1$ and $W_2$ be equal, the zero point of the scale will be obtained by choosing the resistance of $W_3$ equal to that of the thermometer at a certain temperature. Now, for temperatures not considerably differing from the said temperature, the measurements will be exact. If, however, the temperatures intended to be measured are considerably different from that of the zero position of the galvanometer, exact measurements can not be obtained. In using the system, it happens quite frequently, that, for a certain range for example from 0° to 800° centigrade, exact results are not required, while for a certain interval, for example from 700° to 800°, exact results are required. For the interval of from 0° to 800° requiring rough results the aforesaid method will work satisfactorily. In order to obtain good results for the latter interval of from 700° to 800°, I add to the resistance $W_1$ the further resistance E, the sum of the resistances $W_2$ + E being equal to the resistance of the thermometer at a temperature near the interval of the exact measurements, viz. in the example stated, from 700° to 800°. The same result can evidently also be obtained by varying the resistance of one of the other branches, though the method explained appears to be the most convenient one. For obtaining the aforesaid results, the voltage of the current supplied to the bridge must be constant. This may be obtained either by using a constant source of electricity, or by including in the supplying circuit a variable resistance R, when a source of variable voltage is used. The said resistance R may be adjusted so as to furnish the voltage required in the system by means of the testing resistance P referred to above, which may be switched in the branch of the thermometer, while the latter is cut out. By varying the resistance R until the pointer of the galvanometer is at the proper position the voltage required in the system can easily be obtained.

In order to obtain a sufficiently constant voltage for continuous measurements, where a repeated adjustment would be troublesome, means are provided in my improved system, whereby, even when including the system in a lighting circuit the voltage of which constantly varies within large limits, an exact voltage can constantly be obtained. An example of such means is shown diagrammatically in Fig. 2. In this example a polarization cell A and iron resistances N, such as have been used in combination with Nernst lamps, are included in the circuit. As is well known in the art, the said resistances are able to balance voltages varying within large limits, whereby within certain limits, the current does not change. Considerable variations of the voltage of a certain duration are to a large extent absorbed by said resistances. However, as a current supplied from a central station is subjected to fast periodical changes, the indications of the galvanometer would likewise vary according to the said variations of the voltage. To balance these oscillations, the polarization cell A is connected in shunt with the bridge, whereby the oscillations are entirely annihilated. Practical tests have shown, that with variations of the voltage up to 20 per cent. the variations caused in the galvanometer branch of the bridge do not amount to more than a few thousandths. Any desired polarization cell may be used in my system. Good results have been obtained, for example, with cells comprising nickel electrodes in potassium or sodium lye.

An example of the part of my invention, providing means to balance the resistance of the conductor of the thermometer branch, is shown in Fig. 3. In the said example the resistance $W_2$ of the branch adjacent to the thermometer and galvanometer branches is provided with means, whereby its resistance is varied according to the resistance of the conductor including the thermometer branch. The said variation is effected by means of a loop D S provided by the conductor of the resistance $W_2$, and the conductor of the testing resistance P. A sliding contact C connected with one end of the conductor of the thermometer T and with the galvanometer is adapted to cut off equal lengths from the loop portion of the branches of the resistance $W_2$ and the testing resistance P. Now, in order to adjust the system the thermometer is switched off by means of the switch $U_2$, while the testing resistance P is switched in the circuit. The latter is equal to the resistance of the thermometer at a certain known temperature, preferably at the temperature of 0° centigrade. The system will now be so adjusted that no current passes through the galvanometer. If now the thermometer, having the temperature corresponding to the resistance of P be switched in, and the resistance of its conductor be large, the pointer of the galvanometer will show a deviation. By adjusting the sliding contact C so much resistance will now be added to the resistance $W_2$, as is required to bring the pointer of the galvanometer to its former position. By this operation, simultaneously the resistance of P is increased by the amount of the resistance of the conductor of the thermometer, so that it can afterwards be used for testing the system without further adjustment.

Another example of the means to balance the resistance of the said conductor is illustrated in Fig. 4. In this example also a resistance is added to $W_2$ and P which is equal to that of the conductor. To effect this, four conductors 1, 2, 3 and 4 are used which are connected in the system as shown in the said figure. The latter example is particularly useful, where the resistance of the conductor is subjected to considerable variations, caused for example by variations of the temperature. As the conductors 1, 2, and 3 are subjected to the same influences as the conductor 4, their resistances will be equally changed, whereby the variations of the temperature of the said conductors do not exert any influence on the system.

In Fig. 5 I have shown a system embodying the elements explained in detail with reference to Figs. 1, 2 and 3, the function of all the parts being the same. The current supplied by the generator B is reduced to its proper voltage by means of the rheostat R, while the oscillations occurring in the supplying circuit are balanced by means of the iron resistance N and the polarization cell A.

I claim:

1. In a system of electrically measuring temperatures, the combination with a Wheatstone bridge, of a resistance thermometer included in one of the branches of said bridge, a galvanometer included in the central branch of the bridge and having a scale indicating the variations of the temperature of said resistance thermometer, and an iron resistance connected in series with the source of electric current.

2. In a system of electrically measuring temperatures, the combination with a Wheatstone bridge, of a resistance thermometer included in one of the branches of said bridge, a galvanometer included in the central branch of the bridge and having a scale indicating the variations of the temperature of said resistance thermometer, an iron resistance connected in series with the bridge, and a polarization cell connected in shunt with the bridge.

In testimony whereof I have signed my name to this specification in the presence of two subscribing witnesses.

ERNST HAAGN.

Witnesses:
FRANZ HASSLACHER,
ERWIN DIPPEL.